(12) United States Patent
Lin

(10) Patent No.: US 6,382,268 B1
(45) Date of Patent: May 7, 2002

(54) INFLATION DEVICE

(76) Inventor: Sze-Nan Lin, 16F-3, No. 265, Sec. 1, Chien-Kuo South Rd., Taichung City (TW)

( * ) Notice: Subject to any disclaimer, the term of this patent is extended or adjusted under 35 U.S.C. 154(b) by 0 days.

(21) Appl. No.: 09/819,845

(22) Filed: Feb. 28, 2001

(51) Int. Cl.⁷ .................................................. B65B 1/04
(52) U.S. Cl. ........................... 141/67; 141/38; 137/231; 154/415
(58) Field of Search ...................... 141/67, 38; 251/336; 137/223, 231, 228; 152/415

(56) References Cited

U.S. PATENT DOCUMENTS 4,165,760 A * 8/1979 Guenther
5,016,668 A * 5/1991 Nicolino et al.
6,279,599 B1 * 8/2001 Chen

* cited by examiner

Primary Examiner—Steven O. Douglas
(74) Attorney, Agent, or Firm—Charles E. Baxley

(57) ABSTRACT

An inflation device includes a first section having a threaded recess for receiving a valve of an object to be inflated, and a flange extends radially inward from an inner periphery of the first section. A tunnel is defined through the flange and an insertion of a second section extends through a rear end of the first section and is movably engaged with the tunnel. An end member with a path is connected to the insertion and a passage is defined through the second section. The end member is movably inserted in the threaded recess to push a seal pin of the valve in the threaded recess while the valve is air-tightly received in the threaded recess.

4 Claims, 5 Drawing Sheets

INFLATION DEVICE

FIELD OF THE INVENTION

The present invention relates to an inflation device that has a first section air-tightly connected to the valve of an object to be inflated, and a second section independently accessing the seal pin in the valve.

BACKGROUND OF THE INVENTION

A conventional inflation device is shown in FIG. 1 and generally includes a head 11 having a tube extending from a rear end thereof and a passage 14 defined through the tube which is connected to a hose 10 of a pressurized air source. A threaded recess 15 is defined in a front end of the head 11 and a protrusion 13 extends from an inner side of the threaded recess 15. A tiny path is defined through the protrusion 13 and communicates with the passage 14. A seal 12 is mounted to the protrusion 13. A valve 16 of an object to be inflated has a threaded portion which is engaged with the threaded recess 15 of the head 11 and a seal pin 160 in the center of the valve 16 is pushed by the protrusion 13 and opens the path in the valve 16. The pressurized air enters into the valve 16 via the path opened by the seal pin 160. When the pressure in the object reaches a desired level, the head 11 is unscrewed and separated from the valve 16. The seal pin 160 then seals the path in the valve 16 again. However, during the separation of the head 11 and the valve 16, because the seal pin 160 moves not yet to the close position, and the distal end of the valve 16 does not contact the seal 12, the high pressure in the object will escape into the atmosphere via the path in the valve 16. This generates an unsatisfied result, especially for the objects which require precise inflation such as the two cylinders of a bicycle or motorbike suspension system, the pressure of the cylinders is required to be precisely the same.

SUMMARY OF THE INVENTION

In accordance with one aspect of the present invention, there is provided an inflation device and comprises a first section having a threaded recess defined in a first end thereof and a flange extends radially inward from an inner periphery of the first section. A tunnel is defined through the flange and communicates with the threaded recess. A seal is received in the threaded recess and contacts an end of the flange. A second section has an insertion which extends through a second end of the first section and is movably engaged with the tunnel. An end member is connected to the insertion and a path is defined through the end member. A passage is defined through the second section and communicates with the path. The end member is movably inserted in the threaded recess.

The primary object of the present invention is to provide an inflation device that avoid leakage from the valve of an object to be inflated when removing the inflation device from the valve.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
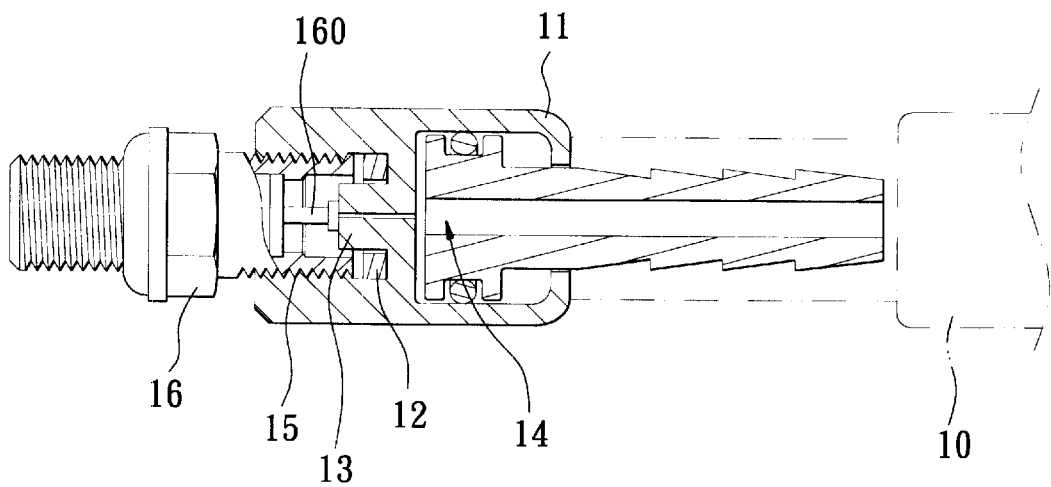
FIG. 1 is a cross sectional view to show a conventional inflation device and a valve of an object to be inflated.
Figure 2:
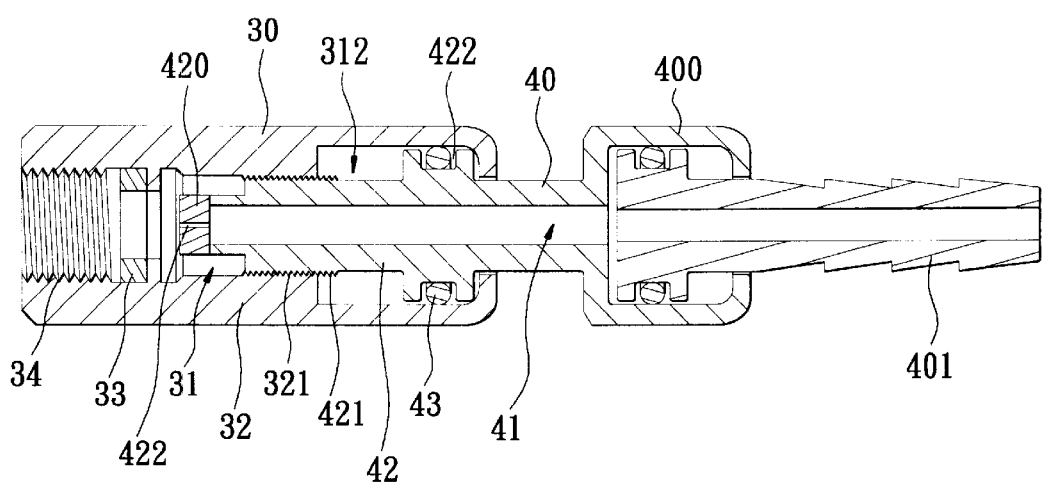
FIG. 2 is a cross sectional view to show an inflation device of the present invention.

Referring to FIG. 2, the inflation device of the present invention comprises a first section 30 having a threaded recess 34 defined in a first end thereof and a flange 32 extends radially inward from an inner periphery of the first section 30. A tunnel 31 is defined through the flange 32 and communicates with the threaded recess 34 and a space 312 defined between the flange 32 and a second end of the first section 30. First threads 321 are defined in an inner periphery defining the tunnel 31 and a seal 33 is received in the threaded recess 34 and contacts an end of the flange 32.

A second section 40 has an insertion 42 which extends through the second end of the first section 30 and has second threads 421 defined in an outer periphery thereof. The first threads 321 are engaged with the second threads 421. An end member 420 is connected to the insertion 42 and a path 422 is defined through the end member 42. A passage 41 is defined through the second section 40 and communicates with the path 422. The end member 420 is sized to be movably inserted in the threaded recess 34. A ring member 422 extends radially outward from the insertion 42 and a seal 43 is mounted to the ring member 422. The seal 43 is engaged with an inner periphery of the space 312 in the first section 30.

Figure 5:
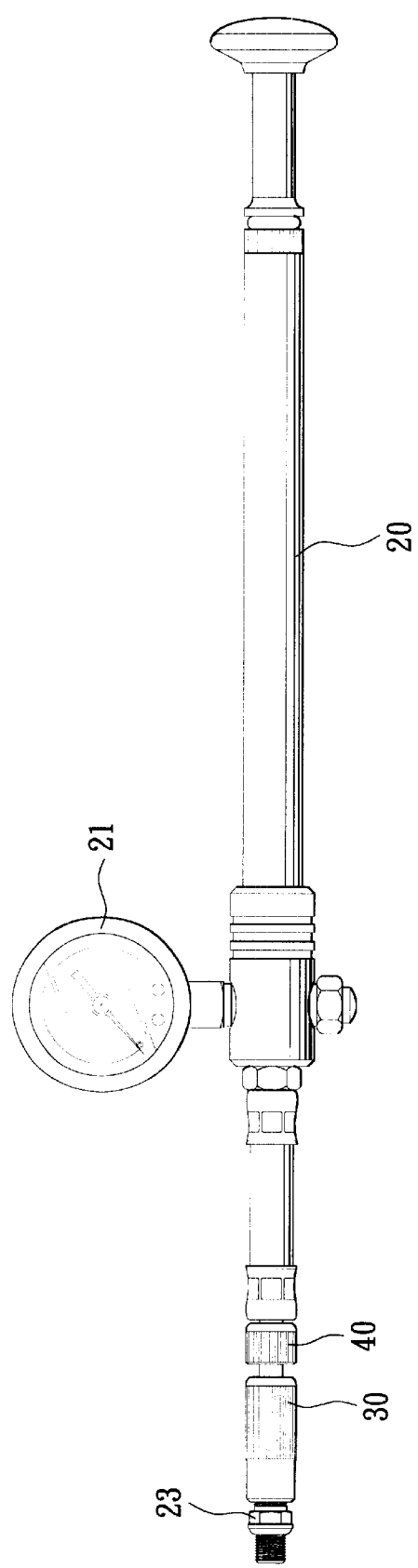
FIG. 5 is a plan view to show an embodiment of the inflation device of the present invention.

Further referring to FIG. 5, a hollow knob 400 is connected to the second section 40 and a connection tube 401 is engaged with the hollow knob 400 so as to be connected to an inflation member 20 which has a pressure gauge 21 to check pressure in the inflation device.

Figure 3:
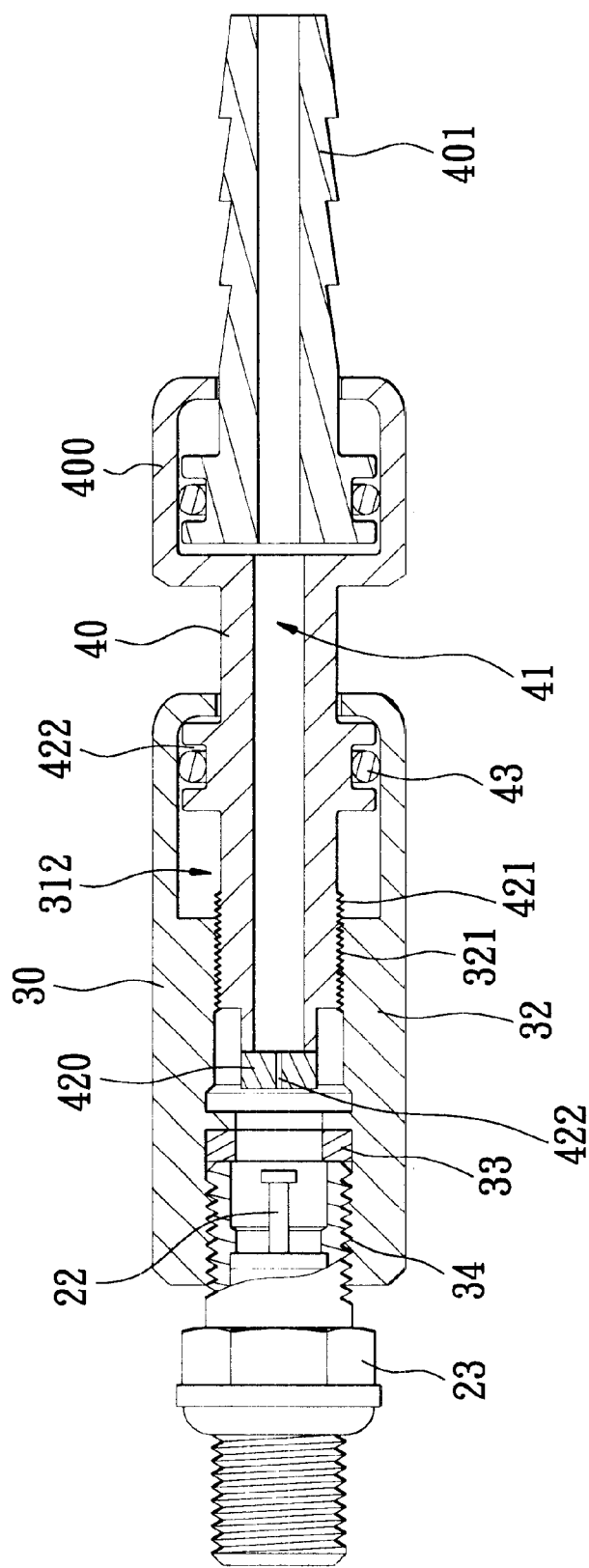
FIG. 3 is a cross sectional view to show the inflation device of the present invention and a valve of an object to be inflated.
Figure 4:
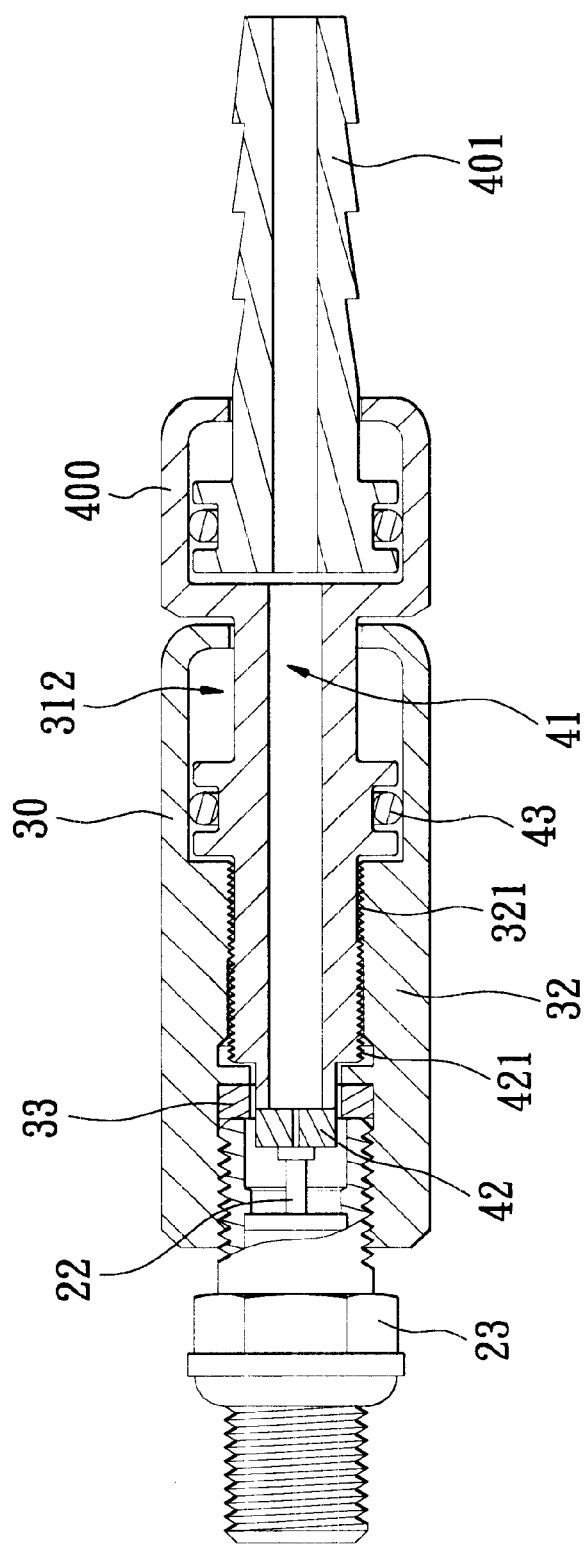
FIG. 4 is a cross sectional view to show the valve is completely engaged with the threaded recess of the inflation device and an end member of the second section is moved toward the seal pin of the valve.

As shown in FIG. 3, a valve 23 of an object to be inflated is threadedly engaged with the threaded recess 34 of the first section 30 till a distal end of the valve 23 is tightly engaged with the seal 33 in the threaded recess 34 as shown in FIG. 4. The second section 42 is then rotatably moved toward the valve 23 by rotating the hollow knob 400 to let the end member 420 push the seal pin 22 of the valve 23. The high pressurized air enters the valve 23 because the seal pin 22 is pushed. When the pressure in the second section 40 reaches to a desired level, because the pressure in the object is equal to the pressure in the second section 40, the second section 40 is rotated in reverse to shift the end member 420 away from the seal pin 22. During the movement of the seal pin 22 bouncing back when the end member 420 is shifted away, because the valve 23 is sealed in the threaded recess 34 so that no leakage between the threaded recess 34 and the valve 23. The first section 30 is then separated from the valve 23.

While we have shown and described the embodiment in accordance with the present invention, it should be clear to those skilled in the art that further embodiments may be made without departing from the scope of the present invention.

What is claimed is:

1. An inflation device comprising:

a first section having a threaded recess defined in a first end thereof and a flange extending radially inward from an inner periphery of said first section, a tunnel defined through said flange and communicating with said threaded recess and a space defined between said flange and a second end of said first section, a seal received in said threaded recess and contacting an end of said flange, and a second section having an insertion which extends through said second end of said first section and movably engaged with said tunnel, an end member connected to said insertion and a path defined through said end member, a passage defined through said second section and communicating with said path, said end member movably inserted in said threaded recess.

2. The device as claimed in claim 1 further comprising first threads defined in an inner periphery defining said tunnel and said insertion having second threads defined in an outer periphery thereof, said first threads engaged with said second threads.

3. The device as claimed in claim 1 further comprising a ring member extending radially outward from said insertion and a seal mounted to said ring member, said seal engaged with an inner periphery of said space in said first section.

4. The device as claimed in claim 1 further comprising a hollow knob connected to said second section and a connection tube engaged with said hollow knob.

* * * * *